United States Patent
Braunstein

(10) Patent No.: US 12,479,329 B2
(45) Date of Patent: Nov. 25, 2025

(54) SYSTEMS AND METHODS FOR IDENTIFYING MODIFICATIONS TO TERRAIN CHARACTERISTICS OF A WORKSITE FOR BATTERY PERFORMANCE

(71) Applicant: Caterpillar Inc., Peoria, IL (US)

(72) Inventor: Michael D. Braunstein, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/626,572

(22) Filed: Apr. 4, 2024

(65) Prior Publication Data
US 2024/0246450 A1 Jul. 25, 2024

Related U.S. Application Data

(63) Continuation of application No. 17/553,894, filed on Dec. 17, 2021, now Pat. No. 11,993,174.

(51) Int. Cl.
*B60L 58/13* (2019.01)
*B60L 58/16* (2019.01)
*G01C 21/34* (2006.01)

(52) U.S. Cl.
CPC .............. *B60L 58/13* (2019.02); *B60L 58/16* (2019.02); *G01C 21/34* (2013.01); *G01C 21/3469* (2013.01); *B60L 2260/16* (2013.01)

(58) Field of Classification Search
CPC ...... B60L 58/13; B60L 58/16; B60L 2260/16; B60L 2240/62; B60L 2250/16; B60L 2260/50; G01C 21/34; G01C 21/3469; G01C 21/3461
See application file for complete search history.

(56) References Cited

U.S. PATENT DOCUMENTS

| | | |
|---|---|---|
| 8,543,272 B2 | 9/2013 | Yu et al. |
| 8,660,760 B2 | 2/2014 | Piipponen et al. |
| 8,983,657 B2 | 3/2015 | Jacobson |
| 9,545,854 B2 | 1/2017 | Daum et al. |

(Continued)

FOREIGN PATENT DOCUMENTS

| | | |
|---|---|---|
| CN | 113946782 A | 1/2022 |
| EP | 3674663 A1 | 7/2020 |
| KR | 10-2021-0062205 A | 5/2021 |

OTHER PUBLICATIONS

Written Opinion and International Search Report for Int'l. Patent Appln. No. PCT/US2022/080906, mailed Apr. 19, 2023 (9 pgs).

*Primary Examiner* — Faris S Almatrahi
*Assistant Examiner* — Dana F Artimez

(57) ABSTRACT

Systems and methods can identify or determine one or more of the candidate route segments of a worksite to modify in order to improve battery usage and/or battery health for one or more vehicles upon future traversal of the one or more candidate route segments by the one or more vehicles. The one or more candidate route segments can be identified using terrain data, battery usage data, and/or battery health data. The one or more identified candidate route segments can be output on a display device. Selection of one or more identified candidate route segments can cause display of battery usage improvement information and/or battery health improvement information.

18 Claims, 6 Drawing Sheets

(56) References Cited

U.S. PATENT DOCUMENTS

| | | |
|---|---|---|
| 9,805,317 B2 | 10/2017 | Gudat et al. |
| 10,948,307 B2 | 3/2021 | Kumar et al. |
| 11,073,401 B1 | 7/2021 | Blanc-Paques et al. |
| 2003/0176968 A1 | 9/2003 | Apsell |
| 2009/0099707 A1* | 4/2009 | Greiner .................. E02F 9/265 |
| | | 701/1 |
| 2010/0094496 A1 | 4/2010 | Hershkovitz et al. |
| 2011/0246004 A1* | 10/2011 | Mineta .................. B60W 20/11 |
| | | 903/903 |
| 2015/0151637 A1* | 6/2015 | Suzuki ...................... B60L 3/12 |
| | | 701/22 |
| 2015/0153736 A1* | 6/2015 | Braunstein ........... G05D 1/0287 |
| | | 701/23 |
| 2016/0258118 A1* | 9/2016 | Jinno ...................... E01C 23/01 |
| 2017/0286886 A1 | 10/2017 | Halepatali et al. |
| 2018/0073208 A1 | 3/2018 | Wilson et al. |
| 2018/0204161 A1 | 7/2018 | Sandulescu et al. |
| 2020/0223359 A1 | 7/2020 | Manci et al. |

\* cited by examiner

SYSTEMS AND METHODS FOR IDENTIFYING MODIFICATIONS TO TERRAIN CHARACTERISTICS OF A WORKSITE FOR BATTERY PERFORMANCE

CROSS-REFERENCE TO RELATED APPLICATION

The present application is a continuation of U.S. application Ser. No. 17/553,894, filed Dec. 17, 2021, the entire contents of which are incorporated herein by reference.

TECHNICAL FIELD

The present disclosure relates generally to methods and systems for managing a worksite and, more particularly, to methods and systems for identifying and modifying physical characteristic of a worksite to enhance battery performance of battery-operated machines as they operate on the worksite.

BACKGROUND

There may be a need to selectively enhance or optimize battery performance for one or more battery electric machines at a worksite.

U.S. Patent Pub. No. 2015/0153736 ("the '736 patent publication") describes a method of modifying a worksite for calibrating a vehicle model used to autonomously control a first machine on the worksite. According to the '736 patent publication the method may include determining that the worksite includes a calibration site having a characteristic corresponding to an aspect of a vehicle model in need of calibration, and that calibrating the aspect of the vehicle model requires modifying the characteristic of the calibration site. The '736 patent publication further describes that the method may further include modifying the characteristic of the calibration site with a second machine at the worksite and directing the first machine to the modified calibration site for autonomous calibration of the aspect of the vehicle model.

SUMMARY

According to an aspect of the present disclosure, a method for identifying modifications to a worksite for battery optimization of a battery electric machine traversing the worksite is described or implemented. The worksite can be segmented according to a plurality of predetermined route segments. The method can comprise: identifying, using a processor, candidate predetermined route segments from among the plurality of predetermined route segments for which to modify the current terrain to improve battery usage and/or battery health for the battery electric machine upon future traversal of said candidate predetermined route segments compared to future traversal of said candidate predetermined route segments each having the current terrain, said identifying being based on current terrain data and historical battery usage and/or battery health data for the candidate predetermined route segments; outputting, on a display device, each of the identified candidate predetermined route segments for which to modify the current terrain to improve battery usage and/or battery health for the battery electric machine upon future traversal of said candidate predetermined route segments; and outputting, on the display device, in response to selection of at least one of the candidate predetermined route segments: specific modification information to modify the current terrain of the selected candidate predetermined route segments to improve battery usage and/or battery health for the battery electric machine, and/or estimated battery usage improvement information and/or estimated battery health improvement information associated with the specific modification information for the current terrain of the selected candidate predetermined route segments.

According to another aspect of the present disclosure, a non-transitory computer-readable storage medium having stored thereon instructions that, when executed by one or more processors, causes the one or more processors to perform a method is described, can be provided, or may be implemented. The method can comprise: determining, using current terrain data and historical battery usage data and/or battery health data, one or more of the candidate route segments of a worksite to modify to improve battery usage and/or battery health for a vehicle upon future traversal of the one or more candidate route segments by the vehicle; controlling output of, on a display device, each of the determined one or more candidate route segments for which to modify; controlling output of, on the display device, estimated battery usage improvement information and/or estimated battery health improvement information for at least one selected candidate route segment from among the determined one or more candidate route segments; and outputting, via a wireless network, signaling that includes instructions to modify the at least one selected candidate route segment to improve the battery usage and/or the battery health according to the estimated battery usage improvement information and/or estimated battery health improvement information.

According to yet another aspect of the present disclosure a system for identifying modifications to terrain characteristics of a worksite to improve performance of battery electric machines traversing the worksite is disclosed or can be provided. The worksite can be segmented according to a plurality of predetermined route segments. The system can comprise: a storage device with non-transitory computer-readable memory having stored therein current terrain data for each of the predetermined route segments and historical battery usage and battery health data associated with each the of the predetermined route segments; a display device configured to display a graphical user interface (GUI); and processing circuitry operatively coupled the storage device to access the current terrain data and the historical battery usage and battery health data. The processing circuitry can be configured to: access the current terrain data and the historical battery usage and battery health data from the storage device, identify one or more candidate predetermined route segments for which to modify the current terrain to improve battery usage and battery health for one or more of the battery electric machines for future traversal of said one or more candidate predetermined route segments, control display of, on the display device, each of the identified one or more candidate predetermined route segments for which to modify the current terrain to improve battery usage and battery health, and control display of, on the display device, in response to selection of at least one of the one or more candidate predetermined route segments using the graphical user interface (GUI): specific modification information to modify the current terrain of the selected at least one of the one or more candidate predetermined route segments in order to improve battery usage and battery health, and estimated battery usage improvement information and estimated battery health improvement information associated with the specific modification information for the current terrain of the selected at least one of the one or more candidate predetermined route segments.

DETAILED DESCRIPTION

The present disclosure relates generally to methods and systems for managing a worksite and, more particularly, to methods and systems for identifying and/or modifying physical characteristics of a worksite with battery performance of one or more battery-operated machines in mind. Some or all of the battery-operated machines may be battery electric machines (i.e., all-electric machines).

Figure 1:
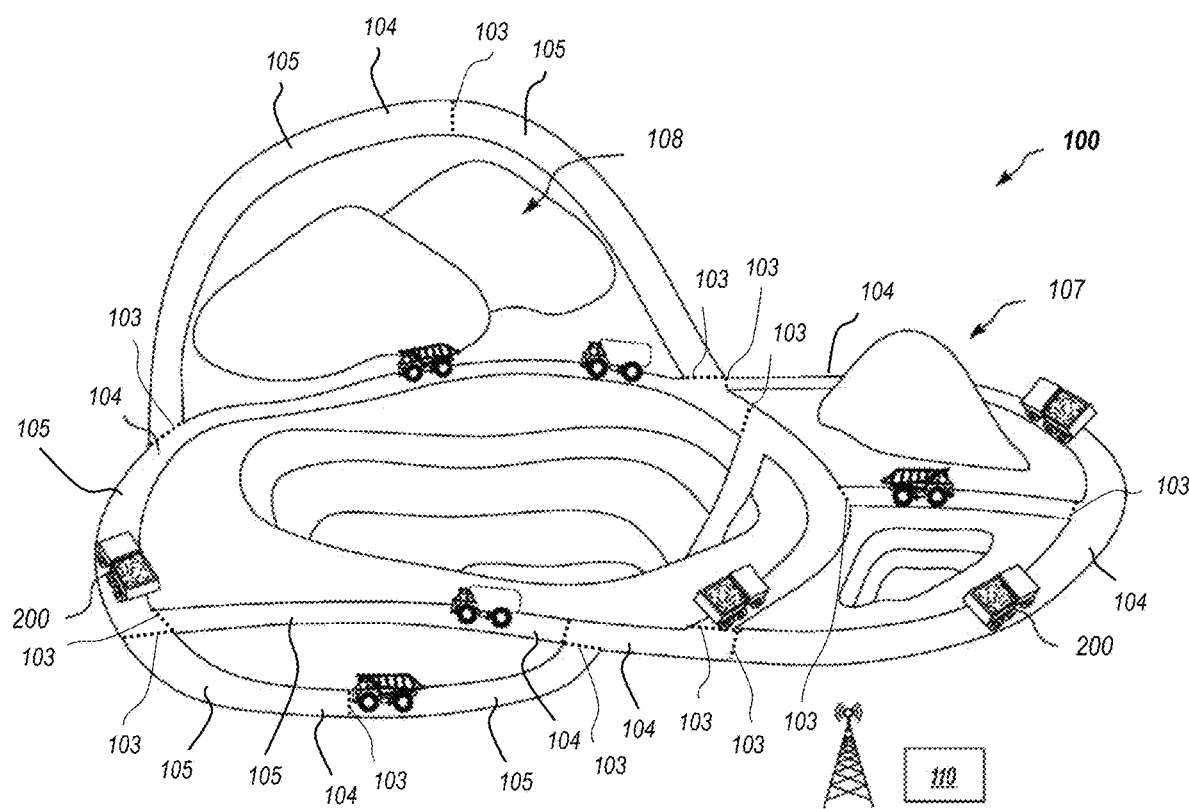
FIG. 1 is a representative illustration of a worksite according to one or more embodiments of the disclosed subject matter.

FIG. 1 illustrates an exemplary worksite 100 according to one or more embodiments of the disclosed subject matter. In one embodiment, the worksite 100 may embody a surface mine site. Alternatively, the worksite 100 may embody a construction site, a landfill, an underground mine site, or any other worksite where one or more physical characteristics of paths of the worksite 100 may be modified.

Referring to FIG. 1, a number of machines 200 can operate at the worksite 100. The machines 200 may include any combination of autonomous (e.g., unmanned) machines, semi-autonomous machines, and operator-controlled machines. Generally, an "autonomous" machine can refer to an unmanned machine that includes on-board and/or off-board computers, processors, and/or other electronic controllers which, based on input from various machine sensors, stored data, and control algorithms, can provide outputs to control various machine systems such as steering, braking, and propulsion to accomplish desired tasks. Semi-autonomous machines may provide some functions that are controlled by the on-board and off-board systems, while allowing an operator to control other functions.

According to one or more embodiments, some or all of the machines 200 can be battery electric machines, as noted above. Here, battery electric machines can mean or be defined as all-electric machines (e.g., battery electric vehicles (BEVs)) that use a battery or batteries exclusively to power the machine during travel or partially electric machines (e.g., hybrid electric vehicles (PHEVs or HEVs)) that use a battery or batteries at least part of the time to power the machine during travel.

The machines 200 employed at the worksite 100 may be of the same type or different types. For example, the machines 200 may include digging machines, loading machines, hauling machines, transport machines, multi-functional machines (e.g., wheel tractor scrapers), and other types of machines. As examples, the machines 200 can be haul trucks, service vehicles, fluid/water delivery trucks, and/or motorgraders. Thus, a variety of battery electric machines may be operated over the worksite 100 at various locations.

The machines 200 at the worksite 100 can be in wireless communication with a worksite management facility 110. The worksite management facility 110 may be located at the worksite 100 or remote from the worksite 100. Optionally, some of the worksite management facility 110 can be at the worksite 100 and some of the worksite management facility 110 can be remote from the worksite 100. The worksite management facility 110, at least according to some embodiments of the disclosed subject matter, may be referred to or characterized as a back-office system. The worksite 100 can have a plurality of paths (e.g., roads) 104 to and from various portions of the worksite 100, such as to and from the loading area 107 and to and from the dumping area 108 (not all paths 104 labeled in FIG. 1). The paths 104 can be predetermined or predefined, meaning that the paths 104 can have been set in advance or exist, i.e., have been created, prior to traversal (initial or subsequent) by the machine(s) 200.

Some or all of the paths 104 can be divided or segmented into one or a plurality of route segments 105 (not all route segments 105 labeled in FIG. 1). According to one or more embodiments, the paths 104 can be divided into segments 105 based on the positions of intersections, start or finish of certain path conditions (e.g., certain grades), or specific zones or areas of the worksite 100 (e.g., the loading area 107 and the dumping area 108). In FIG. 1, for instance, different route segments 105 are defined between pairs of route segment boundaries 103, which are shown by dotted lines drawn across portions of some paths 104.

The route segments 105 can be predetermined or predefined, meaning that the route segment 105 can be set in advance or exist, i.e., have been created, prior to a traversal (initial or subsequent) by the machine(s) 200. Thus, the route segments 105 may be characterized or referred to as predetermined route segments 105. Moreover, the route segments 105 can be added to or be part of a map of the worksite 100. The map of the worksite 100, including the route segments 105, can be stored in memory of the worksite management facility 110 and optionally memory of some or all of the machines 200. The segmentation may be done by an operator setting up the system or automatically based on certain criteria established by the system, such as locations of intersections, grade transition, zones/areas, etc.

One path 104 or multiple paths 104 from one area to another area can be referred to or characterized as a route. Each route can be comprised of one or more paths 104. Hence, each route can be comprised of one or more route segments 105.

Figure 2:
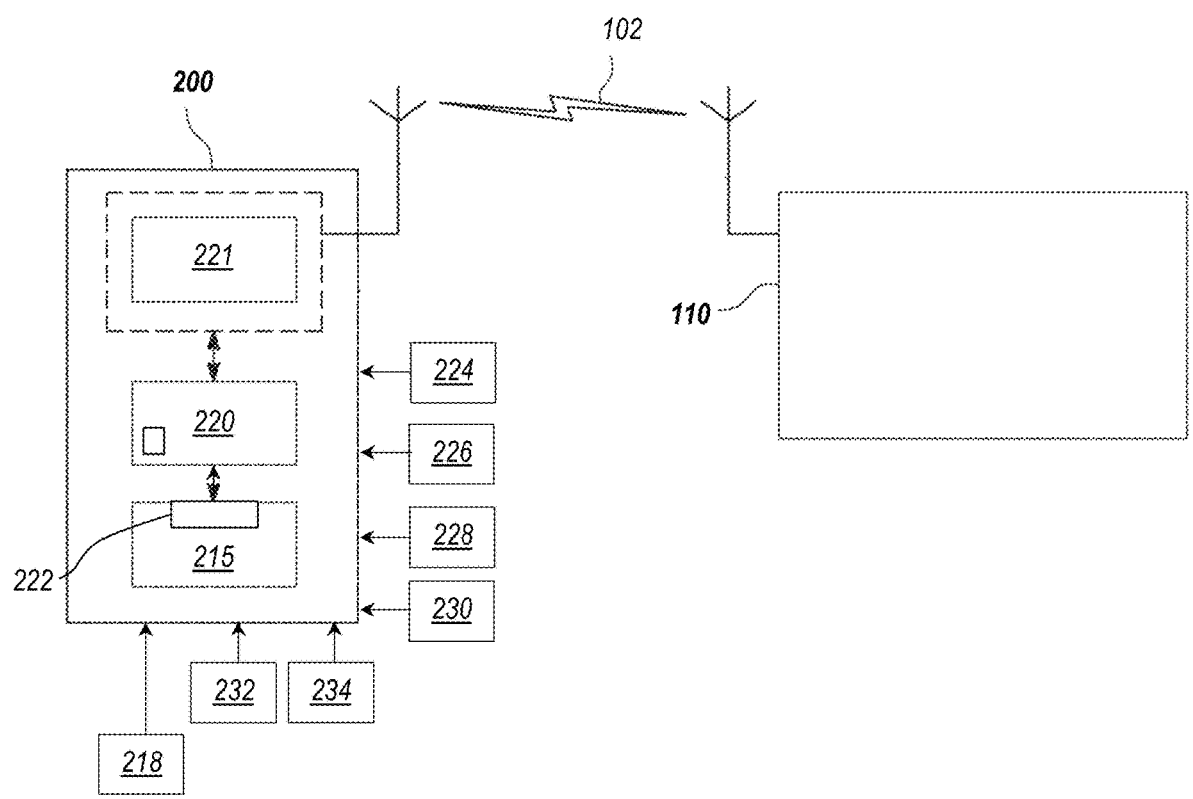
FIG. 2 is a block diagram of a system comprised of a battery electric machine and a worksite management facility according to one or more embodiments of the disclosed subject matter.

FIG. 2 is a block diagram of a system comprised of the machine 200 and the worksite management facility 110, according to one or more embodiments of the disclosed subject matter. The machine 200 and the worksite management facility 110 are also shown in block form. Though only one machine 200 is shown in FIG. 2 the system can include multiple machines 200 of the same or different type.

Generally, the machine 200 can have a data collection system to collect and save operating data of the machine 200 as the machine 200 operates at the worksite 100. Such operating data can be output wirelessly offboard the machine 200, for instance, to the worksite management facility 110. Optionally, such operating data can be sent to one or more additional machines 200 (e.g., also wirelessly).

The machine 200 can include, among other systems and components, a power source 215, a frame supported by one or more traction devices, and a controller 220. The controller 220, which may be implemented in or using circuitry, may be referred to or characterized as an electronic control module (ECM). In this example, traction devices can include tires, tracks, or a combination of the two.

The power source 215 may include a non-combustion source of power, particularly an electrical power source, such as one or more batteries (e.g., a single battery, a battery pack having multiple batteries, or a fuel cell (e.g., fuel cell hybrid)) and one or more electric motors driven by the one or more batteries to propel the machine 200. Optionally, in addition to the non-combustion source of power a combustion source of power, such as an internal combustion engine (e.g., diesel, gasoline, natural gas, etc.), may be provided, as part of the power source 215 or an additional power source, according to one or more embodiments of the disclosed subject matter. As noted above, the machine 200 can be an all-electric machine that uses a battery or batteries exclusively to power the machine 200 during travel or a partially electric machine (e.g., hybrid electric vehicles (PHEVs or HEVs)) that use a battery or batteries at least part of the time to power the machine 200 during travel. According to one or more embodiments, the power source 215 may include a trolley (charging while moving system), wherein portions of the paths 104 may have overhead power lines and a connection to the machine 200 to supply power over particular portions of the paths 104.

The machine 200 can also include a sensor 222, which may be or include multiple sensors, to sense characteristics of the power source 215, such as battery performance-related characteristics. One or more sensors 218 and/or one or more sensors 224-234 can also be implemented. According to one or more embodiments, some or all of the sensor(s) 222, some or all of the sensors 218, and/or some or all of the sensors 224-234 can be considered part of the data collection system of the machine 200.

Battery performance-related characteristics can include internal battery temperature, temperature associated with a battery cooling system, capacity, charge time, discharge time, voltage, current, state-of-charge (SOC), internal resistance/impedance/conductance, self-discharge (leakage), depth-of-discharge (DOD), load, etc. Thus, sensor 222 can include one or more temperature sensors, voltage sensors, current sensors, etc. to sense corresponding characteristics of the battery(ies). Discussed in more detail below, data from the sensor 222 can be reflective of and/or used to determine battery performance, which can mean or include battery usage and/or battery health (e.g., State of Health (SoH)). Battery life (estimated) can also be determined, for instance, based on battery usage and/or battery health. Battery life may be quantized in terms of life cycle (charging/discharging) of the battery. For instance, the more throughput of energy through the battery the more cycles are expended, and the fewer remaining cycles remain. Lower power, i.e., lower discharge rate, may also make the battery last for more cycles.

Battery usage can be in terms of how much energy is used for a given distance or period of time. This can be characterized as battery throughput and can include rate of discharge of the battery or amount of power used over the given distance or period of time. Optionally, battery usage can include or otherwise factor in energy provided back to the battery, for instance, via regenerative braking.

Battery health can be relative to battery specifications or a new state of the battery and thus may be represented as a percentage of degradation of capability of the battery compared to the battery specifications/new state. Battery health, in the long term, may be affected by factors such as rate of discharge, battery temperature, spikes in battery load (rather than continuous discharge), etc.

According to one or more embodiments, the sensor 222 can be part of a battery management system, for instance, together with the controller 220 (or another processor), that can monitor how the battery is used over time. Such battery management system can monitor battery performance-related characteristics and identify accumulated damage over time, degradation over time, etc. The battery management system can estimate battery life using, for instance, one or more battery life estimation models based on the monitored battery performance-related characteristics.

Each sensor 218 may be used for object detection. The objects detected by sensor 218 may include specific areas of the worksite 100, for example, areas at which material is loaded and unloaded, geographical features of worksite 100, other autonomous or human-operator-controlled machines at the worksite 100, and any obstructions on the worksite 100. In an exemplary embodiment, machine 200 may be equipped with one or more short range sensors, one or more medium range sensors, and/or one or more long range sensors, for instance, located at different positions about the machine 200. Each of the sensors 218 may embody a device that detects position, configuration, shape, and/or orientation of objects disposed within a sensing range of the sensors 218. One or more of the sensors 218 may include a LIDAR device, a RADAR device, a SONAR device, an IR or non-IR camera device, and/or any other sensing device known in the art. In one possible example, sensors 218 may include an emitter that emits a detection beam and an associated receiver that receives a reflection of that detection beam. Based on characteristics of the reflected beam, a distance and a direction from an actual sensing location of the sensors 218 on machine 200 to a portion of the sensed object may be determined. Sensors 218 may then generate a position signal corresponding to the distance and direction and communicate the position signal to the controller 220. The controller 220 may receive the position signal from the sensors 218 and, using a calibrated vehicle model, for instance, may operate machine 200 to avoid a collision with the sensed object. For example, the controller 220 may steer machine 200 to the left or right to avoid an object that is detected by sensors 218.

Speed sensor 224, which may be or include one or more sensors, may detect an actual ground or travel speed of the machine 200 as the machine 200 moves about the worksite 100. The speed of machine 200 may be detected in a variety of ways. For example, speed sensor 224 may detect a number of revolutions over a given time period for a component of the traction device of the machine 200, such as a wheel hub, and either speed sensor 224, the controller 220, or another processor may determine the speed of machine 200 using this information. In another embodiment, the speed sensor 224 may measure an actual distance traveled by machine 200 over a given time period, and either speed sensor 224, the controller 220, or another processor may determine the speed of machine 200 based on this information. Speed sensor 224 is not limited to a specific location on machine 200, however, and is not limited in the way or manner of detecting the speed of the machine 200.

Steering angle sensor 226, which may be or include one or more sensors, may detect an actual steering angle of machine 200. The steering angle may be detected in a variety of ways. For example, steering angle sensor 226 may sense a location, angle, and/or other characteristic of a component of the traction device of the machine 200, such as a wheel hub. In another embodiment, steering angle sensor 226 may sense a location, angle, and/or other characteristic of another component of machine 200, such as a rack and/or a pinion when machine 200 is turned by a rack-and-pinion steering system. In that case, a rotation angle of the pinion and/or a translation of the rack may be sensed, and either steering angle sensor 226, the controller 220, or another processor may determine the steering angle of machine 200 using this information. Steering angle sensor 226 is not limited to a specific location on machine 200, however, and is not limited in the way or manner of detecting the steering angle of the machine 200.

Load weight sensor 228, which may be or include one or more sensors, may detect an actual weight of material being hauled by the machine 200, in the event the machine 200 is configured to haul material on worksite 100. The weight of the load carried by machine 200 may be detected in a variety of ways. For example, load weight sensor 228 may measure decreases in effective lengths of one or more springs supporting a dump body of the machine 200, and either load weight sensor 228, the controller 220, or another processor may determine the weight of material hauled by the machine 200 using this information. Load weight sensor 228 is not limited to a specific location on machine 200, however, and is not limited in the way or manner of detecting the weight of material being hauled by the machine 200. For instance, additionally or alternatively, load weight can be obtained from sources offboard the machine 200, such as payload monitoring associated with a scale or a loader communicating with a central controller. After the machine 200 performs a dumping operation the payload weight can be assumed as zero.

Load distribution sensor 230, which may be or include one or more sensors, may detect an actual distribution of the weight of the material being hauled by machine 200. The distribution of the weight hauled by the machine 200 may be detected in a variety of ways. For example, load distribution sensor 230 may measure decreases in effective lengths between or among groups of springs supporting dump body of the machine 200. By comparing lengths of springs on the front of dump body to lengths of springs on the back of dump body, and/or to lengths of springs on the left or right side of dump body, either load distribution sensor 230, controller 220, or another processor may determine the distribution of the weight of the material hauled by machine 200 based on such comparisons. Load distribution sensor 230 is not limited to a specific location on the machine 200, however, and is not limited in the way or manner of detecting the distribution of weight of material being hauled by the machine 200.

Orientation sensor 232, which may be or include one or more sensors, may determine an actual orientation of the machine 200 at the worksite 100. The orientation of machine 200 may include a roll of the machine 200, which may be an angle measured about a roll axis that extends generally between a front and a back of the machine 200, and/or may include a pitch of the machine 200, which may be an angle measured about a pitch axis that extends generally between left and right sides of the machine 200. Orientation sensor 232 may directly detect the orientation of machine 200 (e.g., detect the orientation of machine 200 relative to an artificial horizon), or may detect the orientation of an area on the ground that supports the machine 200. Either orientation sensor 232, the controller 220, or another processor may determine the orientation of machine 200 using this information. Orientation sensor 232 is not limited to a specific location on the machine 200, however, and is not limited in the way or manner of detecting the orientation of the machine 200.

Location and heading sensor 234, which may be or include one or more sensors, may determine an actual geographical location and/or an actual heading of the machine 200 at the worksite 100. Such information may be referred to or characterized as position information, hence, the location and heading sensor 234 may be characterized as sensing position of the machine 200 and hence a position sensor. The location and heading of machine 200 may be detected in a variety of ways. For example, location and heading sensor 234 may utilize a positioning system to determine various operating parameters of the machine 200 such as velocity, pitch rate, yaw rate, roll rate, etc. A positioning system, which can include the location and heading sensor 234, may utilize Global Positioning System (GPS) data optionally along with data from an Inertial Measurement Unit (IMU), which typically includes one or more yaw rate sensors such as gyroscopes, to calculate heading. In another embodiment, location and heading sensor 234 may include a local position detecting system that indicates the geographical location and/or heading of the machine 200 relative to one or more transmitters at the worksite 100. Perception-based localization may additionally or alternatively be used to determine location of the machine 200. Either location and heading sensor 234, the controller 220, or another processor may determine the location of the machine 200 and/or the actual heading of the machine 200 based on this information. Location and heading sensor 234 is not limited to a specific location on machine 200, however, and is not limited in the way or manner of detecting the location (position) and/or heading of the machine 200.

The above-described sensor(s) 222, sensor(s) 218, sensor(s) 224-234, and/or other sensors may each generate signals corresponding to the detected conditions of the machine 200 and may communicate the signals to the controller 220. The controller 220 may receive the signals from sensor(s) 218, sensor(s) 224-234, and/or other sensors and enter information carried by one or more of the signals into, for example, a memory, a look-up table, a control map, and/or a control algorithm within the machine 200 (e.g., within the controller 220).

The controller 220 may include components configured to monitor, record, condition, store, index, process, determine, calculate, and/or communicate information received from sensor(s) 218, sensor(s) 224-234, and/or other sensors. These components may include, for example, a memory, one or more data storage devices, one or more processors or central processing units, and/or any other components, including tangible, physical, and non-transitory components (hardware and software), which may be used to run, for instance, one or more disclosed applications according to embodiments of the disclosed subject matter. Furthermore, although aspects of the present disclosure may be described generally as being stored within a controller memory, one skilled in the art will appreciate that these aspects can be stored on or read from different types of computer program products or non-transitory and tangible computer-readable media such as computer chips and secondary storage devices, including hard disks, floppy disks, optical media, CD-ROM, or other forms of RAM or ROM. The controller 220 may communicate with, receive information and/or instructions from, or, according to one or more embodiments, otherwise be controlled, at least in part, by the worksite management facility 110.

The machine 200 can have communication circuitry 221, which can include an antenna, a transmitter, a receiver, interfaces, etc., to communicate with the worksite management facility 110. As noted above, the machines 200 at the worksite 100 can be in wireless communication with the worksite management facility 110, for instance, via one or more wireless networks 102. The wireless communication can be such that information may be transmitted to and received from the worksite management facility 110. For example, information related to various operational parameters of the machines 200, as sensed by the sensor(s) 222, the sensors 218, the sensor(s) 224-234, and/or other sensors, may be transmitted to the worksite management facility 110. The operational parameters may be referred to or characterized as machine operating data, as described above. Non-limiting examples of machine operating data that can be output from the machine 200, using the communication circuitry 221, to the worksite management facility 110, can include machine position, machine speed, direction of travel, one or more battery performance-related characteristics (e.g., temperature, capacity, internal resistance/impedance/conductance, charge time, discharge time, voltage, current, state-of-charge (SOC), on-board calculated battery usage, on-board calculated battery life, on-board calculated battery health, etc.), gear setting, etc.

Accordingly, various one or more sensors and/or one or more controllers 220 of the machine 200 shown in FIG. 2 and optionally other machines, such as the machines 200 shown in FIG. 1, may communicate with the worksite management facility 110 over suitable one or more communication networks associated with the worksite 100 (e.g., wireless network 102). Exemplary communication networks can include a satellite communication system. Alternatively or additionally, the communication network(s) may include one or more broadband communication platforms appropriate for communicatively coupling the machine(s) 200 to the worksite management facility 110 via the communication circuitry 221, such as cellular, short-range, microwave, point-to-point wireless, point-to-multipoint wireless, multipoint-to-multipoint wireless, or any other appropriate communication platform for networking a number of components.

Worksite management facility 110 may include components configured to monitor, record, condition, store, index, process, calculate, determine, and/or communicate information received from the controller 220 or directly from the sensor(s) 222, the sensor(s) 218, the sensor(s) 224-234, and/or other sensors of some or all of the machines 200 at worksite 100. The components can also monitor, record, condition, store, index, process, calculate, determine, and/or communication worksite information either from machines 200 or other sources at the worksite 100 or remote from the worksite 100. These components may include, for example, a memory, one or more data storage devices, one or more processors or central processing units, or any other components, including tangible, physical, and non-transitory (hardware and software) components, which may be used to run, for instance, one or more disclosed applications according to embodiments of the disclosed subject matter.

Figure 4:
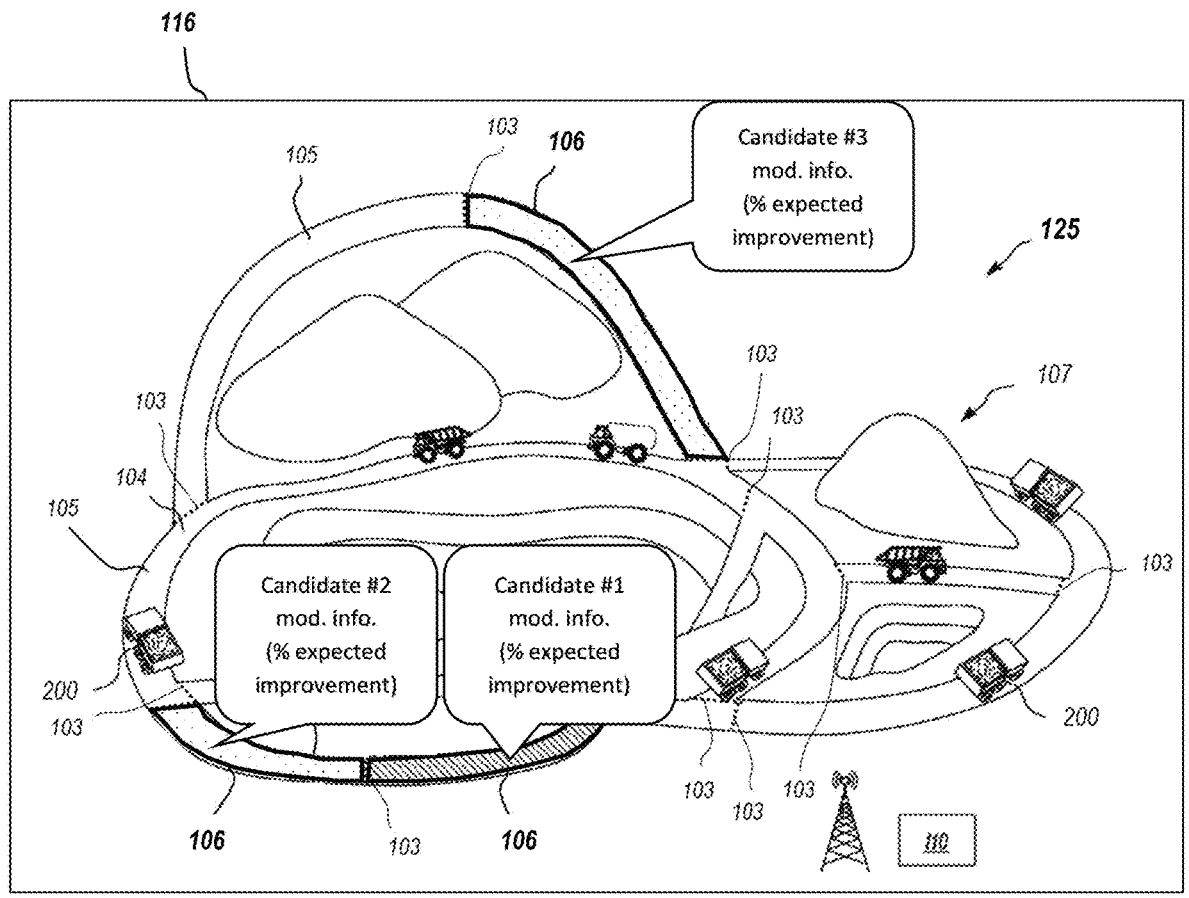
FIG. 4 shows a representative illustration of a display provided on a display device according to one or more embodiments of the disclosed subject matter.

A map 125 of the worksite 100 can be created and can include various portions of the worksite 100, including the different paths 104 and the different areas, such as the loading area 107 and the dumping area 108. FIG. 4 shows an example of the map 125 of the worksite 100 according to one or more embodiments of the disclosed subject matter.

The map 125 of the worksite 100 may be stored in memory of the worksite management facility 110. Optionally, the map 125 may be stored in memory of the one or more of the machines 200, for instance, in memory of or associated with the controller(s) 220.

Figure 3:
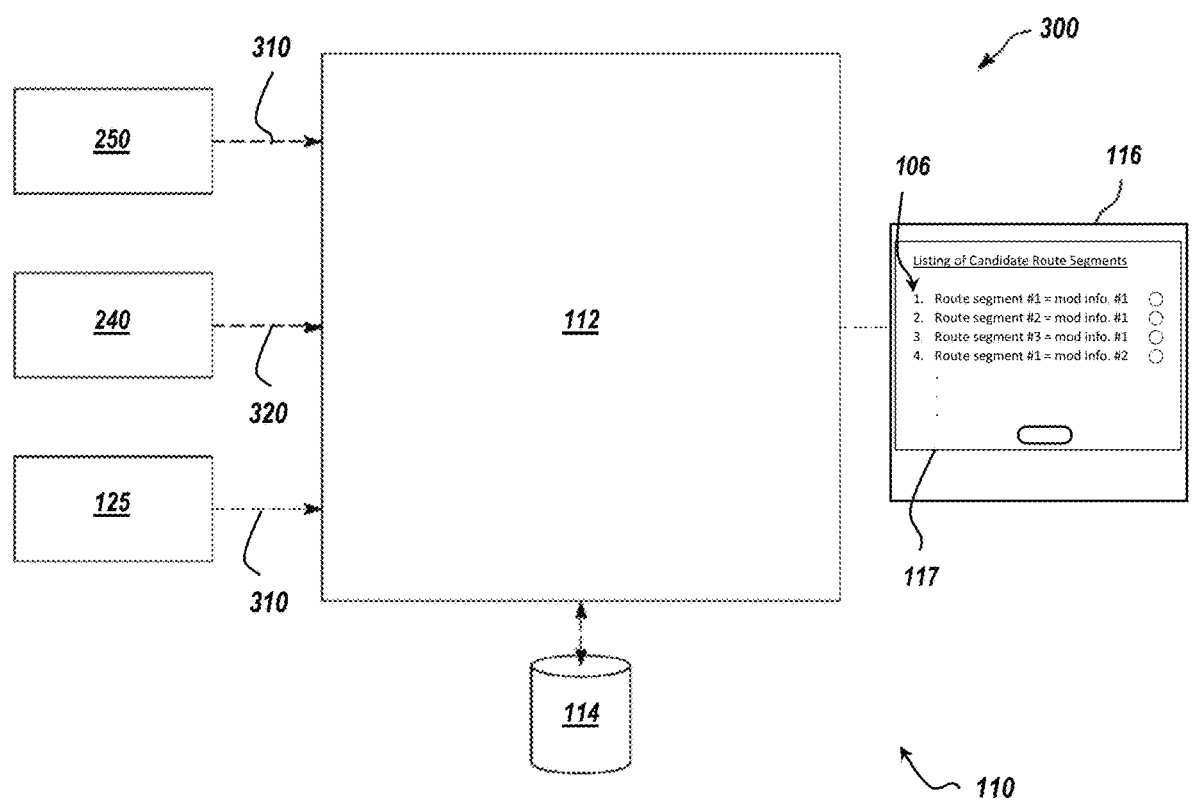
FIG. 3 is a block diagram of a system according to one or more embodiments of the disclosed subject matter.

Turning now to FIG. 3, this figure is a block diagram of a system 300 according to one or more embodiments of the disclosed subject matter, particularly focused on aspects to enhance or optimize battery performance of one or more of the machines 200 (e.g., collectively) for future travel of one or more of the route segments 105 based on modifications of physical characteristics of one or more of the route segments 105.

The system 300 can include the worksite management facility 110, which can include one or more processors 112, memory 114 provided within the one or more processors 112 and/or external to the one or more processors 112, and one or more displays 116. The processor(s) 112, which may be implemented in or using circuity, may be referred to individually or collectively as processing circuitry.

The display 116, which may be referred to or characterized as a display device, may be configured to display a graphical user interface (GUI) 117, which may serve as part of an operator interface. At least some inputs to the worksite management facility 110 may also be considered part of the system 300. The memory 114 may be considered or characterized as a storage device with non-transitory computer-readable memory.

As inputs, the worksite management facility 110 can receive machine information or data 250 pertaining to the machine(s) 200. At least in some respects, such machine information 250 may be different from the machine operating data 240 received from the machine(s) 200, as discussed above, for instance. According to one or more embodiments, the machine information 250 can include, for each of the machine(s) 200, machine type (e.g., hauler, loader; make and model of machine, etc.), battery specifications (e.g., type, capacity, rating(s), average battery life/life cycles, etc.), and/or machine characteristics (e.g., make, model, limitations such as weight and/or load limit or speed limit, maximum operating capacity, etc.).

The machine information 250 can be received by the processor 112 of the worksite management facility 110, for instance, from a source other than the machines 200. As an example, the machine information 250 may be manually inputted via the operator interface associated with the worksite management facility 110. Such inputting may be performed at the worksite 100 or remote from the worksite 100, even before association of the machine(s) 200 with the worksite 100. Optionally, some or all of the machine information 250 may be sent to the worksite management facility 110 directly, for instance, via one or more wireless networks 310. The machine information 250 can be stored in the memory 114 of the worksite management facility 110.

The worksite management facility 110 also can receive as an input map data or information to form or that forms the map 125 of the worksite 100. As noted above, the map 125 can include various portions of the worksite 100, including the different paths 104 and the different areas, such as the loading area 107 and the dumping area 108. One or more of the route segments 105 can be provided as part of the map 125 for some or all of the paths 104, or some or all of the route segments 105 can be provided after the map 125 has been received and stored in the memory 114 of the worksite management facility 110. That is, according to one or more embodiments, the worksite management facility 110 may be used to add (including modify) some or all of the route segments 105 to the paths 104 of the map 125.

The map 125 can include path data or information pertaining to some or all of the paths 104. The path information can include characterizations of the path 104, such as physical characterizations pertaining to length, grade (e.g., % and/or incline, flat, decline, start/end), surface (e.g., rolling resistance, composition, hardness or softness, wetness or dryness, roughness/smoothness), geometry/shape (e.g., curved, straight, width, banking, etc.), intersections, etc. Such path physical characterizations may be considered or characterized as physical features of the path 104 and may be referred to herein individually or collectively as terrain.

The physical characterizations of the paths 104 included as part of or in association with the map 125 can refer to or characterize current physical features of the paths 104. Hence, the current physical characterizations of the paths 104 can be referred to or characterized as current terrain data or information. Current terrain data can be provided in association with some or all of the paths 104. Moreover, the current terrain data can be associated with each path 104 on a per-route segment 105-basis. Thus, current terrain data may be associated with some or all of the route segments 105 of the map 125.

The map 125, particularly the map data or information, or portions thereof, can be received by the worksite management facility 110, for instance, by the processor(s) 112, from a source external to the worksite management facility 110 and/or a source internal to or at the worksite management facility 110. Examples of sources external to the worksite management facility 110 include one or more of the machines 200 or other systems or mechanisms (e.g., drones, satellites, etc.) that have mapped or that are mapping the worksite 100. An example of a source internal to or at the worksite management facility 110 may be manually inputted data or information via the operator interface associated with the worksite management facility 110 (e.g., via the GUI 117 on the display 116). The map 125, particularly the map data or information, can be stored in the memory 114 of the worksite management facility 110. The map data can be retrieved from the memory 114 using the processor 112 for display of the map 125 on the display 116.

The worksite management facility 110 also can receive as inputs machine operating data or information 240 from the machine(s) 200, for instance, as captured using the sensor(s) 218, the sensor(s) 222, and/or the sensor(s) 224-234, via the communication circuitry 221 of the machine(s) 200. Such machine operating data 240 may be captured as the machine(s) 200 traverse the worksite 100, along one or more of the paths 104.

The machine operating data 240 can include battery usage data regarding how much energy the battery used when the machine 200 traveled over one or more of the route segments 105 of the path(s) 104. The machine operating data 240 may also include battery health data associated with travel of the machine 200 over the one or more route segments 105. As examples, battery health data can include battery temperature data and/or battery rate of discharge data from the sensor 222.

At least in some respects, the machine operating data 240 can be representative of characteristics of the worksite 100. For instance, the machine operating data 240 may be used by the controller 220 of the machine 200 and/or the processor 112 of the worksite management facility 110 to determine the terrain, or portions thereof, over which the machine 200 traverses, for example, on a per-route segment basis 105. In effect the machine 200 may be used as a transducer to generate the machine operating data 240 representative of terrain, for instance, in order to perform condition monitoring of the terrain for the route segments 105 of the worksite 100.

As an example, distance traveled by one of the machines 200, as captured by the speed sensor 224 and/or the location and heading sensor 234, can be representative of a length of one or more of the paths 104 or route segments 105. As another example, slip data and/or strut pressure data based on signals from corresponding sensors on the machine 200 can indicate that the terrain is wet and uneven or bumpy, respectively. The controller 220 can use the slip data to determine rolling resistance of the machine 200. And the controller 220 can use the strut pressure data to determine roughness/smoothness of the terrain. The determined rolling resistance and/or the determined roughness/smoothness of the terrain can form part of the machine operating data 240 and may be used to determine physical characteristics of the terrain.

In addition or alternative to the machine operating data 240 discussed in the preceding paragraph, machine operating data 240 in the form of battery usage data and/or in the form of battery health data can be respectively compared against prior battery usage data/battery health data across the same route segment 105 to determine changes in the terrain (e.g., degradation) of the route segment 105. According to one or more embodiments, the processor 112 of the worksite management facility 110 can perform the comparison. Alternatively, the controller 220 (or some other processor) of each machine 200 can perform the comparison and output the result to the worksite management facility 110.

As an example, the battery usage of the machine 200 through a particular route segment 105 may have increased compared to one or more previous times (e.g., an immediately previous time) of the machine 200 traversing the route segment 105. This may be due to the terrain becoming more rough or bumpy and thus causing machine 200 to experience more rolling resistance and/or uneven travel speed requiring acceleration events that use more battery. The processor 112 of the worksite management facility 110 can identify the increase in battery usage by comparing the battery usage data (as the machine operating data 240) against previously received battery usage data from prior traversal(s) by the machine 200 and/or other machines 200 (e.g., of same or similar type and/or operating conditions). If the increase satisfies certain criteria, for instance, an increase above a predetermined threshold, the processor 112 can identify that the increase is caused by a degradation in the terrain of the route segment 105. As noted above, such identification based on battery usage can also be based on other forms of the machine operating data 240 such as the slip data and/or the strut pressure data.

As another example, the battery temperature through the route segment 105 may have increased on average or to a maximum value (e.g., spike) compared to one or more previous times (e.g., an immediately previous time) of the machine 200 traversing the route segment 105 and/or one or more other machines 200 traversing the route segment 105 (e.g., of same or similar type and/or operating conditions). If the battery temperature change satisfies certain criteria, for instance, an increase above a predetermined temperature threshold, the processor 112 can identify that the change is caused by a degradation in the terrain of the route segment 105. Such identification based on battery temperature can also be based on other forms of the machine operating data 240 such as the battery usage, the slip data, and/or the strut pressure data.

The examples above are based on comparisons of historical machine operating data to current machine operating data 240. However, embodiments of the disclosed subject matter are not so limited. For instance, identification that one or more battery performance-related characteristics satisfies certain criteria, for instance, reaching or exceeding a predetermined threshold, can be indicative that the terrain has an undue impact on battery performance and may need to be physically modified to rectify or mitigate the effect of the terrain on battery performance.

The determination that the terrain change has satisfied the predetermined criteria may be classified in terms of severity. For instance, the change in terrain identified by the processor 112 can be associated with one of multiple levels of severity. The association may be classified or characterized as a severity index. In some cases, one or more levels of severity may indicate that no physical modification to the terrain is presently necessary to improve battery performance and one or more levels of severity may indicate that physical modification to the terrain is presently necessary to improve battery performance.

When the terrain is determined to satisfy the predetermined criteria, the processor 112 can provide an indication recommending physical modification of the terrain for the route segment 105 to rectify or mitigate the terrain. Such indication can indicate specifically in what way or ways the terrain of the route segment 105 should be modified. The indication can also indicate the way or ways (including specific amount estimates) in which the battery performance will be affected by the physical change to the terrain.

The machine operating data 240 can be passed from the machine(s) 200 to the worksite management facility 110 via the one or more wireless networks 320. The wireless network(s) 320 may be the same as the wireless network 102 referred to in FIG. 2.

According to one or more embodiments, the machine operating data 240 may be stored in the memory 114 of the worksite management facility 110, for instance, in association with one or more route segments 105 respectively corresponding to one or more of the paths 104. The machine operating data 240 may also be stored in association with each machine 200 or each machine type, battery type, machine configuration, etc. As noted above, machine operating data 240 can include machine position, machine speed, direction of travel, one or more battery characteristics (e.g., temperature, capacity, charge time, discharge time, voltage, current, state-of-charge (SOC), on-board calculated battery usage, on-board calculated battery life, on-board battery health, etc.), gear setting, terrain, etc. Thus, historical machine operating data 240 can be saved in the memory 114 for comparison against current machine operating data 240, for instance, to determine specific changes in the terrain (e.g., degradation) of each of the route segments 105.

In that the controller 220 of the machine 200 may determine the terrain (e.g., from slip data and/or strut pressure data) based on traversal of the paths 104, the machine operating data 240 received by the worksite management facility 110 may also include terrain determinations for the route segments 105. Additionally or alternatively, according to one or more embodiments, the processor 112 of the worksite management facility 110 can determine the terrain of the route segments 105 using some or all of the machine operating data 240 and optionally other information, such as the machine information 250. In any case, such machine operating data 240, whether stored or otherwise provided or used, may be considered historical data. And in that current terrain data can be associated with one or more route segments 105, it logically follows that since the machine operating data 240, i.e., historical machine operating data, can be associated with one or more route segments 105 of the map 125, the historical machine operating data can also be associated with the current terrain data for the corresponding one or more route segments 105.

Optionally, if the machine 200 has not already provided the information, the processor 112 may calculate battery usage for each machine 200 and/or a collection or set of the machines 200 (e.g., all of the machines 200 at the worksite 100) on a segment-by-segment basis for a previous trip or trips of the machine 200 or the collection of machines 200 for each particular route segment 105. Such battery usage data, whether stored in the memory 114 or otherwise provided or used, may be considered historical data. Accordingly, the historical battery usage data can be associated with the current terrain data for the corresponding one or more route segments 105.

Additionally or alternatively, optionally, if the machine 200 has not already provided the information, the processor 112 may calculate battery health for each machine 200 and/or the collection of machines 200 on a segment-by-segment basis for the previous trip or trips of the machine 200 or the collection of machines 200 for each particular route segment 105. Such battery health data, whether stored in the memory 114 or otherwise provided or used, may be considered historical data. Accordingly, the historical battery health data can be associated with the current terrain data for the corresponding one or more route segments 105.

Battery usage may be a direct indicator of how much electrical energy has been used for a particular route segment 105. In some respects, battery usage may be considered or characterized as battery cost, for instance, the cost for "replacing" (i.e., recharging) the expended electrical energy. Whether calculated by the machine 200 or the processor 112, battery usage, per machine 200, can be determined by identifying how much energy has been used by the machine 200 upon traversal of the route segment 105.

Here, the determined battery usage can be associated with historical machine operating data. Thus, underlying machine operating data 240 may be correlated to the amount of battery usage for the route segment 105, which, as discussed in more detail below, may be used for later determining candidate route segments 105 for possible physical modification in order to enhance or optimize battery usage of the machine 200. For instance, the machine 200 may use more of its battery when loaded versus unloaded. As such, the amount of battery usage may be categorized based on the specific machine operating data 240 occurring during traversal of the route segment 105. In this regard, the battery usage from one traversal or multiple traversals may be categorized into one or more categories based on the specific machine operating data 240 occurring during traversal(s) of the route segment 105. The categories may be used to extrapolate estimates of battery usage when determining the candidate route segments 105 for possible physical modification to enhance or optimize battery usage of the machine 200.

The determined battery usage values can be saved. For instance, the battery usage values can be saved in the memory 114. The determined battery usage values, whether saved in the memory 114 or otherwise, can be referred to or characterized as historical battery usage data. As noted above, the determined battery usage values can be saved in correspondence with the associated route segments 105, and the determined battery usage values can be saved in correspondence with the terrain for the associated route segments 105.

Whether calculated by the machine 200 or the processor 112 of the worksite management facility 110, battery health, per machine 200, may be determined according to one or more methodologies. For instance, one or more embodiments may implement statistical modeling based on historical data of similar (or the same) batteries and optionally based on the type of machine and/or categories of machine operating data (e.g., loaded versus unloaded). Additionally or alternatively, battery health can be determined based on comparisons between the battery specifications or the new state of the battery (e.g., original charge-holding capacity of the battery) compared to battery performance-related characteristics of the battery over time.

The determined battery health data can be saved. For instance, the battery health data can be saved in the memory 114. The determined battery health data, whether saved in the memory 114 or otherwise, can be referred to or characterized as historical battery health data. As noted above, the determined battery health data can be saved in correspondence with the associated route segments 105, and the determined battery health data can be saved in correspondence with the terrain for the associated route segments 105.

System 300 can be operative to identify one or more route segments 105 of the worksite 100 for potential physical modification of the terrain thereof in order to enhance or optimize battery performance of one or more of the machines 200 for future traversal of the route segment(s) 105. Such identified route segments 105 may be referred to or characterized as candidate route segments (or candidate predetermined route segments). Optionally, the system 300 may prioritize the candidate route segments according to the greatest potential for battery performance improvement. According to one or more embodiments, a site operator can assess the proposed candidates to determine whether the cost of making the change is viable compared to the value of the improvement. Here, value can mean less battery usage and/or improved or at least less negative impact on battery health. According to one or more embodiments, the system 300 can provide instructions or commands and optionally control, for instance, via the processor 112 of the worksite management facility 110, one or more machines 200 to actually make the physical modifications to the terrain of selected ones of the route segment(s) 105.

The processor 112 can identify or determine one or more candidate route segments 106 (see FIG. 3 and FIG. 4), from among the route segments 105 of the worksite 100, for which to modify the current terrain in order to improve battery performance (e.g., battery usage and/or battery life) of one or more of the machines 200 upon future traversal of the one or more route segments 105. That is, the processor 112 can determine which route segments 105, if any, if physically modified, would lead to improvement of battery performance of one or more machines 200 should the one or more machines 200 travel along the route segment(s) 105 in the future. This can involve determining the way or ways in which the terrain of the candidate route segment 106 can be modified to achieve the improvement(s) in battery performance, as well as the specific way in which battery performance is expected to be improved. Such future travel may be in comparison to future travel of the machine(s) 200 without making the physical modification to the terrain (i.e., according to the current terrain) of the route segment 105. The candidate route segment determination may be performed in response to an input to the operator interface, for instance, to the graphical user interface (GUI) 117 on the display 116.

As noted above, battery performance can include one or more characteristics of the battery, such as battery usage and/or battery health. Generally, improvement of battery usage can mean or include less energy throughput through the battery for the route segment 105. In terms of battery health, as examples, improving battery health can mean or include preventing battery temperature from reaching a predetermined battery temperature threshold, preventing battery charge from decreasing or dropping at a rate of discharge greater than a predetermined threshold, and/or preventing spikes in battery load.

The determining of the one or more candidate route segments 106 can involve accessing the stored battery data, i.e., the historical battery data, for one or more of the route segments 105. Such processing can also involve accessing current terrain data, which may be stored in association with the map 125 of the worksite 100, for instance, and saved in the memory 114 of the worksite management facility 110, for the one or more route segments 105. The determining the one or more candidate route segments 106 can also be based on how many machines 200 will or are expected to traverse the route segment 105, which machine 200 or machines 200 will or are expected to traverse the route segment 105, and/or how many times the machine 200 or machines 200 will or are expected to traverse the route segment 105. Thus, the determination as to whether each route segment 105 can be physically modified to enhance or optimize battery performance can be relative to a single machine 200 or a collection of machines 200 (e.g., all machines 200, select set of machines 200 (e.g., all same type), etc.) that will or that are expected to traverse the route segment 105. Thus, in order for a proposed physical change to have a suitable enough impact to expend resources to make the change can depend upon the number of times the machines 200 are expected to traverse the route segment 105.

According to one or more embodiments, whether each route segment 105 can be physically modified to enhance or optimize battery performance of one or more of the machines 200 for future traversal of the route segment 105 (and the way(s) of modification and specific battery performance improvement) can be determined based on the previous data, including the historical battery data, historical terrain data, and/or current terrain data. For example, when analyzing a route segment 105 to determine whether the route segment 105 qualifies as a candidate route segment 106, battery performance-related characteristics associated with the current terrain for the analyzed route segment 105, for instance, based on historical battery data of machine(s) 200 that have already traversed the route segment 105, may be compared against battery performance-related characteristics of one or more other route segments (including the analyzed route segment if it had a certain terrain prior to the current terrain), current or historical for the worksite 100 and/or another worksite, having differing terrain characteristics to assess whether any (e.g., one or more) of the differing terrain characteristics, if implemented for the analyzed route segment 105, would lead (likely lead) to enhancement or optimization of battery performance of one or more of the machines 200 for future traversal of the analyzed route segment 105. Extrapolation and/or mapping using similarities of the one or more other route segments (exclusive of the terrain characteristics) with the analyzed route segment 105 may be used as part of the process of determining the way(s) of modification and the specific battery performance improvement, if any, and hence whether the route segment 105 can be physically modified to improve battery performance of the one or more of the machines 200 for future traversal of the route segment 105.

A database having data for similar machines and similar routes with certain terrain characteristics can be used to provide a comparison to assess what the value of the changes would be. For example, if the current segment has a 3% grade for a given model of haul truck based on the data received while one or more trucks of that type were running over a given route segment 105 for a month period, based on similar trucks running under similar conditions elsewhere on the worksite 100 at a 4% grade that battery usage was improved above a certain threshold, then the system 300 can flag that route segment 105 as a potential for improvement by changing the grade from 3% to 4%. In another example, the database of data might show that for similar trucks running at a different site, running at a 4% grade had better results, or simulated data could be used for the comparison. Typically, the comparison may try to be as close as possible, by using the same truck, or similar models, under similar running conditions and payloads. In another example, based on the moisture content as monitored by various sensors positioned along the route segment 105, or on machines 200 running the route segment 105, or based on models that track moisture content, machines 200 can be identified to have better performance at certain moisture content, then a recommendation can be made for watering that route segment 105 (or allowing it to dry).

The specific way or manner in which the route segment 105 can be modified to achieve the battery performance improvement can include or pertain to, relative to the current terrain, length, grade (e.g., % and/or incline, flat, decline), surface (e.g., rolling resistance, composition, hardness or softness, wet or dry), geometry/shape (e.g., curved, straight, width, etc.), etc. In this regard, specific values can be identified. For instance, the determination may identify, as one way to improve battery performance, that a decrease in the incline of the route segment 105 of 2% can lead to suitable battery performance improvement. Suitable, in this context, can mean improvement by a predetermined amount, for instance, also factoring in the cost associated with actually making the physical modification to the terrain. Optionally, multiple specific ways of physical modification can be determined per candidate route segment 106. Of course, such specific values can be estimates, at least as they pertain to the corresponding amount of battery improvement.

The specific battery performance improvement (e.g., enhancement or optimization) can include or pertain to, relative to the current terrain, battery improvement in terms of amount of energy saved for the route segment 105, difference in amount of energy used for the route segment 105, cost savings, difference in machine down time (e.g., time due to charging amount and/or speed, battery replacement), preventing battery rate of discharge from reaching or exceeding a predetermined threshold, ensuring battery rate of charge reaches or exceeds a predetermined threshold (e.g., for regenerative braking), preventing battery charge from decreasing below a predetermined charge threshold, for instance, upon completion of the route segment 105, etc. Indeed, as noted above, battery performance can be in terms of battery usage and/or battery health for one machine 200 or multiple machines 200. In this regard, specific values can be identified. For instance, the determination may identify that one physical modification to the candidate route segment 106 can result in an energy savings of 10% for one machine 200, or multiple machines 200 collectively or cumulatively, that traverse(s) the route segment 105 under the physical modification compared to the same machine(s) 200 traversing the route segment 105 under the current terrain of the route segment 105 (i.e., without the physical modification). Of course, such specific values can be estimates. Relating the specific battery performance improvement to the physical modification, as one example, the determination may in a sense determine that if the grade of a particular route segment 105 or route segments 105 is changed by a certain amount or to a certain grade (e.g., 5% to 2%), this change would decrease battery usage over the segment(s) 105 by 20% compared to the current terrain. As an example, the candidate route segment 106 callouts in FIG. 4 can show the specific amount of expected battery performance improvement for the particular physical modification to the corresponding route segment 105.

According to one or more embodiments, the specific battery performance improvement can be with respect to multiple route segments 105, for instance, multiple successive route segments 105, that may form one or more paths 104 or routes through the worksite 100. For instance, summing the specific battery performance values, for instance, battery usage, for a set of the route segments 105 can provide an overall battery improvement value (or values) for the particular route made up of multiple route segments 105.

For the determining of the candidate route segments 106, the determining may be based on a predetermined threshold or thresholds. That is, according to one or more embodiments, the route segment 105 may be determined to be a candidate route segment 106 when the amount of enhancement of battery performance (e.g., decrease in battery usage and/or less negative impact on battery health) for the proposed physical modification is above the predetermined threshold(s). The amount of improvement may be compared to battery performance-related characteristics without the physical modifications being made (i.e., the current terrain). Optionally, the predetermined threshold(s) can be set based on budget, for instance, budget based on cost and/or energy used or conserved. Thus, the budget may change based on changing cost of electricity (e.g., to recharge) or some other variable factor, such as cost of fuel, work hours, etc. for the machines to make the physical modification(s) to the route segment 105.

If one or more candidate route segments 106 are determined by the processor 112 to exist, the processor 112 can control output of the candidate route segment(s) 106, for instance, on the display 116. Such outputting can involve listing the candidate route segments 106 on the display 116 and/or indicating the candidate route segments 106 on the map 125 shown on the display 116.

FIG. 3, for instance, shows an example of candidate route segments 106 displayed in a list on the display 116. According to one or more embodiments, the list may be displayed within or in association with the graphical user interface (GUI) 117 output on the display 116. Modification information, that is, information regarding how the candidate route segment 106 is to be physically modified and/or information specifying the battery performance enhancement or improvement (e.g., including a specific value) associated with the physical modification, can be displayed in association with the candidate route segment 106. Such modification information is shown generally in FIG. 3 as "mod info." The candidate route segments 106, though shown in FIG. 3 as merely identified as a numerical value, can be additionally or alternatively be identified by specific labeling associated with the worksite 100. Optionally, such modification information may be displayed only when the operator selects the candidate route segment 106 on the GUI 117.

FIG. 4, for instance, shows the candidate route segments 106 displayed on the map 125 on the display 116. The candidate route segments 106 can be displayed without any of the machines 200 or with the machines 200 (which may be shown moving in real-time), such as shown in FIG. 4. According to one or more embodiments, the candidate route segments 106 for consideration to improve battery performance (e.g., battery usage and/or battery health) of one or more of the machines 200 for future traversal of the corresponding one or more route segments 105 may be identified directly, for instance, overlaid, on the map 125. For instance, such one or more candidate route segments 106 may be shown highlighted or in a different color on the map 125. FIG. 4 highlights a border around three route segments 105 to identify that these route segments 105 constitute candidate route segments 106. FIG. 4 also shows different patterning within the highlighted border, where the different patterns can represent recommended prioritization of the candidate route segments 106 for achieving battery performance improvement. In this example the hatched candidate route segment 106 may be recommended as the highest priority compared to the candidate route segments 106 with dots. Additionally or alternatively, call-outs, such as shown in FIG. 4, can identify the candidate route segments 106. The call-outs may appear when the operator selects one of the candidate route segments 106. Alternatively, the call-outs may automatically be shown when the candidate route segments 106 are initially identified.

Modification information, that is, information regarding how the candidate route segment 106 is to be physically modified and/or information specifying the battery performance enhancement or improvement (e.g., including a specific value) associated with the physical modification, can be displayed in association with the candidate route segment 106. As discussed below, optionally, such modification information may be displayed only when the operator selects the candidate route segment 106.

According to one or more embodiments, the candidate route segments 106 can be shown or displayed in terms of priority, as noted above. For instance, in the case of the list, such as shown in FIG. 3, the candidate route segment 106 to physically modify that would result in the greatest enhancement to battery performance (for one or more machines 200) may be displayed first in the list and so on. In the case of the candidate route segments 106 being shown in the map 125, the candidate route segments 106 may be prioritized by color or some other visual differentiator.

Such prioritization may be in terms of greatest to least amount of improvement or enhancement for battery performance. As specific examples, the prioritization can be with respect to improvement of battery usage, improvement of battery health (including less degradation), and/or improvement of both battery usage and battery health. In some cases, there may be different lists for different battery characteristics, such as a list for improvement of battery usage, a list for improvement of battery health, and a list for both battery usage and battery health. Thus, embodiments of the disclosed subject matter can show the candidate route segments 106 that would benefit the most (or least), in terms of improvement or enhancement of battery performance, from physically changing the terrain of the corresponding route segments 105.

In that the list of candidate rouge segments 106 or the candidate route segments 106 identified on the map 125 can be shown within or in association with the graphical user interface 117, the operator may select one or more of the candidate route segments 106 (or portion thereof) shown on the display 116. Optionally, multiple candidate route segments 106 may be selected at the same time (i.e., preceding candidate route segments 106 may remain selected upon selection of another candidate route segment 106). According to one or more embodiments, this can include hovering a pointer over the candidate route segment 106 or contacting the candidate route segment 106 for a predetermined amount of time, for instance, to generate a caption or the like with additional modification information. Additionally or alternatively, selection of one or more candidate route segments 106 can lead to further processing to actually physically modify the route segment 105 for the selected candidate route segment 106 (discussed in more detail below). Optionally, multiple successive, sequential, or contiguous candidate route segments 106 may be selected.

According to one or more embodiments, multiple (e.g., two) candidate route segments 106 can be associated with a single route segment 105. That is, one route segment 105 may have different modification candidates in terms of physical changes to be made and/or improvement in battery performance. For instance, FIG. 3 shows that route segment #1 has, as listed candidate route segments 106, a first modification (i.e., mod info. #1) and a second modification (i.e., mod info. #2). Here, the physical changes to the route segment #1 and/or the battery improvement for the route segment #1 can be different for the first candidate route segment 106 compared to fourth candidate route segment 106 (for route segment #1).

Figure 5:
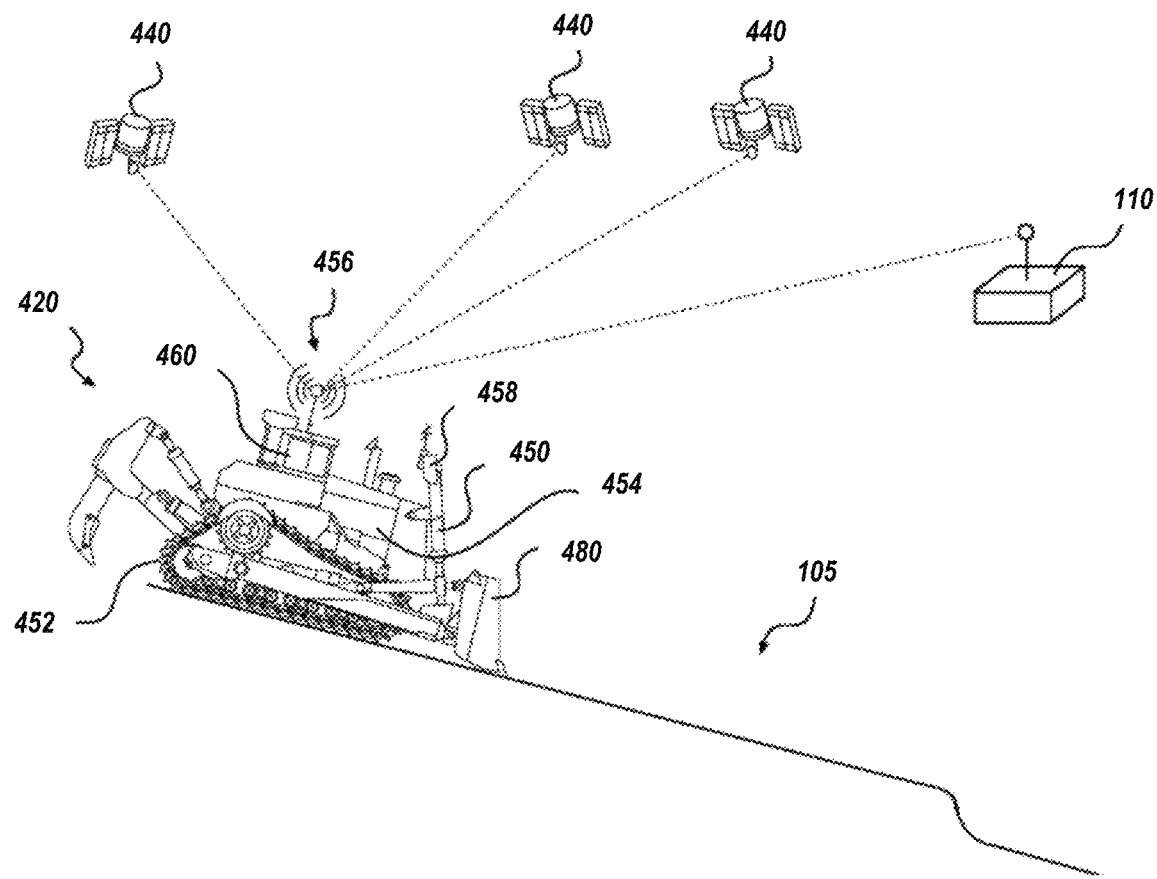
FIG. 5 is a pictorial illustration of a machine to modify a physical characteristic of a worksite according to one or more embodiments of the disclosed subject matter.

Once the operator, for instance, at the worksite management facility 110, has selected one or more candidate route segments 106 to physically modify (which can include in what way to modify the one or more route segments 105) to enhance battery performance (e.g., battery usage and/or battery life) of subsequent traversal of the corresponding one or more route segments 105, the worksite management facility 110 can output a command or instruction to one or more machines 420, such as shown in FIG. 5, to make the modification(s) to the one or more route segments 105. Such one or more machines 420 may be different, at least in part, from the machines 200. Embodiments of the disclosed subject matter are not limited to the type of machine 420 shown in FIG. 5 for making the modifications to the route segments 105. Thus, the machine 420 can be motor graders, water trucks, haul trucks, bull dozers, etc.

Machine(s) 420 may be semi-autonomous or non-autonomous. In such cases, for example, worksite management system 110 may provide the operator of semi-autonomous and/or non-autonomous machines 420 with recommended actions that semi-autonomous and/or non-autonomous machines 420 may take to assist in the modification of the route segment 105 of the worksite 100. Such recommended actions may be presented to the operator via a monitor or other electronic display, including the display 116.

FIG. 5 illustrates exemplary machine 420 that may be used to assist in making such modifications to worksite 100. Machine 420 may embody an earth moving machine such as a dozer having a blade or other work tool 480 movable by way of one or more motors or actuators 450. Machine 420 may also include one more traction devices 452 which may function to steer and/or propel the machine 420. Machine 420 may be directed by worksite management system 110 to perform a task or tasks related to the specific modification of the selected route segment(s) 105 to achieve the battery performance improvement determined by the processor 112.

For example, such tasks may include a dozing operation, a grading operation, a leveling operation, a bulk material removal operation, and/or any other type of operation that results in alteration of the current terrain (as described above) of the route segment(s) 105. In some embodiments, worksite management facility 110 may coordinate with and/or otherwise control the one or more machines 420 to make modifications to the terrain enhance battery performance (e.g., battery usage and/or battery life) of subsequent traversal of the one or more route segments 105.

As illustrated in FIG. 5, a control system associated with machine 420 may include on-board components that interact to affect operation of machine 420 in response to instructions received from worksite management system 110 and/or positional information received from one or more satellites 440. In particular, the control system may include a power source 454 used to power actuators 450 and traction devices 452, a locating device 456, a tool position sensor 458, and/or an on-board controller 460. On-board controller 460 may be in communication with power source 454, actuators 450, traction devices 452, locating device 456, and/or tool position sensor 458 via multiple different communication links (not shown) to autonomously control operations of machine 420.

Power source 454 may include an engine such as, for example, a diesel engine, a gasoline engine, a gaseous fuel powered engine such as a natural gas engine, or any other type of engine apparent to one skilled in the art. Power source 454 may alternatively include a non-combustion source of power such as a fuel cell, a power storage device, an electric motor, or other similar mechanism. Power source 454 may be connected to traction devices 452 and/or actuators 450 via a direct mechanical coupling, an electric circuit, a hydraulic circuit, or in any other suitable manner.

Locating device 456 may embody an electronic receiver configured to communicate with satellites 440 to determine a location of machine 420 relative to satellites 440. In particular, locating device 456 may receive and analyze high-frequency, low power radio signals from multiple satellites 440 to triangulate a 3-D position relative to the different satellites 440. A signal indicative of this position may then be communicated from locating device 456 to on-board controller 460. Alternatively, locating device 456 may embody an Inertial Reference Unit (IRU), a component of a local tracking system, or any other known locating device that receives and/or determines positional information associated with machine 420.

Position sensor 458 may embody any type of sensor configured to detect a position of a work tool 480 relative to a known position on machine 420 (for example, relative to locating device 456), and generate a corresponding signal. In one example, position sensor 458 may be an acoustic, magnetic, or optical-type sensor associated with actuators 450 and/or one or more linkages that move work tool 480. In another example, position sensor 458 may be a local and/or global positioning sensor configured to communicate with off-board devices (for example, local laser systems, radar systems, satellites, etc.) to directly determine local and/or global coordinates of work tool 480. It should be noted that any number and/or type of position sensors 458 may be included and positioned at any location on or near work tool 480. Based on signals generated by position sensors 458 and based on known kinematics of machines 420, each on-board controller 460 may be configured to determine, in real time, a location of the associated work tool 480 relative to the known position of machine 420 and communicate the location to on-board controller 460 for further processing.

On-board controller 460 may include components configured to monitor, record, store, index, process, and/or communicate the location of machine 420 and position of work tool 480. In addition, such components may be configured to automatically control operations of machine 420 based on instructions received from worksite management system 110. These components may include, for example, a memory, one or more data storage devices, a central processing unit, or any other components that may be used to autonomously operate machine 420. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM. Such components may be similar to those described above with respect to on-board controller 420.

On-board controller 460 may further include components configured for communicating with worksite management system 110. For example, on-board controller 460 may include hardware and/or software that enables sending and receiving of data messages through a direct data link (not shown) or a wireless communication link (not shown). The wireless communications may include satellite, cellular, infrared, and any other type of wireless communications that enable on-board controller 460 to exchange information with worksite management system 110.

Worksite management system 110, based on various user inputs and location information from locating device 456 and position sensor 458, may be configured to execute instructions stored on computer readable medium to perform various methods of excavation planning and control for machines 420, particularly pursuant to the physical modifications to the route segment 105 needed to achieve the selected battery performance improvement (compared to the current terrain of the route segment 105). Excavation planning methods may further include determining a number of passes through each sequence required to accomplish an excavation phase, and determining a number of phases required to complete an excavation plan. Worksite management system 110 may store in memory various excavation plans for accomplishing modifications and/or construction of route segments 105 (including new route segment(s) 105 of a new path 104).

INDUSTRIAL APPLICABILITY

As noted above, embodiments of the present disclosure relate to methods and systems for identifying and optionally modifying physical characteristic of a worksite to enhance battery performance of battery-operated machines as they operate on the worksite. Some or all of the battery-operated machines may be battery electric machines (i.e., all-electric machines). Thus, embodiments of the disclosed subject matter can identify and modify physical characteristics of one or more route segments of a worksite to enhance battery performance for a fleet of electric machines, for instance.

According to one or more embodiments, the present disclosure can be viewed as pertaining to a system and method for site planning for optimized battery electric vehicle operations. The system can include a site plan with many paths/roads/routes that are provided through an uploaded site map. The potential routes can be divided into route segments based on the position of intersections, loading, etc. and each route segment can have various parameters and information assigned to the route segment. The route segments may then be targeted for improvements for machine and battery optimization such as increasing or decreasing grade, watering, road management based on the provided data. Vehicle sensors may provide data with respect to battery charge, temperatures, speed, location, braking system, modes of operation, weight, rolling resistance, etc. A comparison to the expected increase in efficiency over time can be done versus a cost of the change, to assist in decision making and prioritization of processes. In another embodiment, the system can compare various machines that traverse the same route segment to assess overall impact to a fleet of machines of various types, status, battery type, and battery status.

In another embodiment, rather than looking at charge use over a segment, the system may look at braking energy required over each route segment and optimize performance to match with a specific braking regeneration requirement, in combination, for instance, with a preferred blended braking strategy. For example, if it is determined that current requirement for braking regeneration using the preferred braking strategy is a value for a given segment, but the operator would like to maintain charge at a particular level, or have an optimal braking regeneration amount over the segment, the system can determine whether a physical change (or changes) to the route segment could achieve the desired result, and provide an indicator to the site manager, along with a cost of the proposed modification. In another embodiment, the system can monitor temperatures, in particular temperatures associated with braking and regeneration, and combine temperature assessments with the proposed physical changes based on charge use or regeneration requirements.

Thus, generally, systems and methods according to embodiments of the disclosed subject matter can identify or determine one or more of the candidate route segments of a worksite to modify in order to improve battery usage and/or battery health for one or more vehicles upon future traversal of the one or more candidate route segments by the one or more vehicles. The one or more candidate route segments can be identified using terrain data, battery usage data, and/or battery health data. The one or more identified candidate route segments can be output on a display device. Selection of one or more of the identified candidate route segments can cause display of battery usage improvement information and/or battery health improvement information in correspondence with physical modifications to make to the candidate route segment(s) in order to achieve improved battery usage and/or battery health for one or more vehicles traveling along the route segment(s) having been physically modified.

Figure 6:
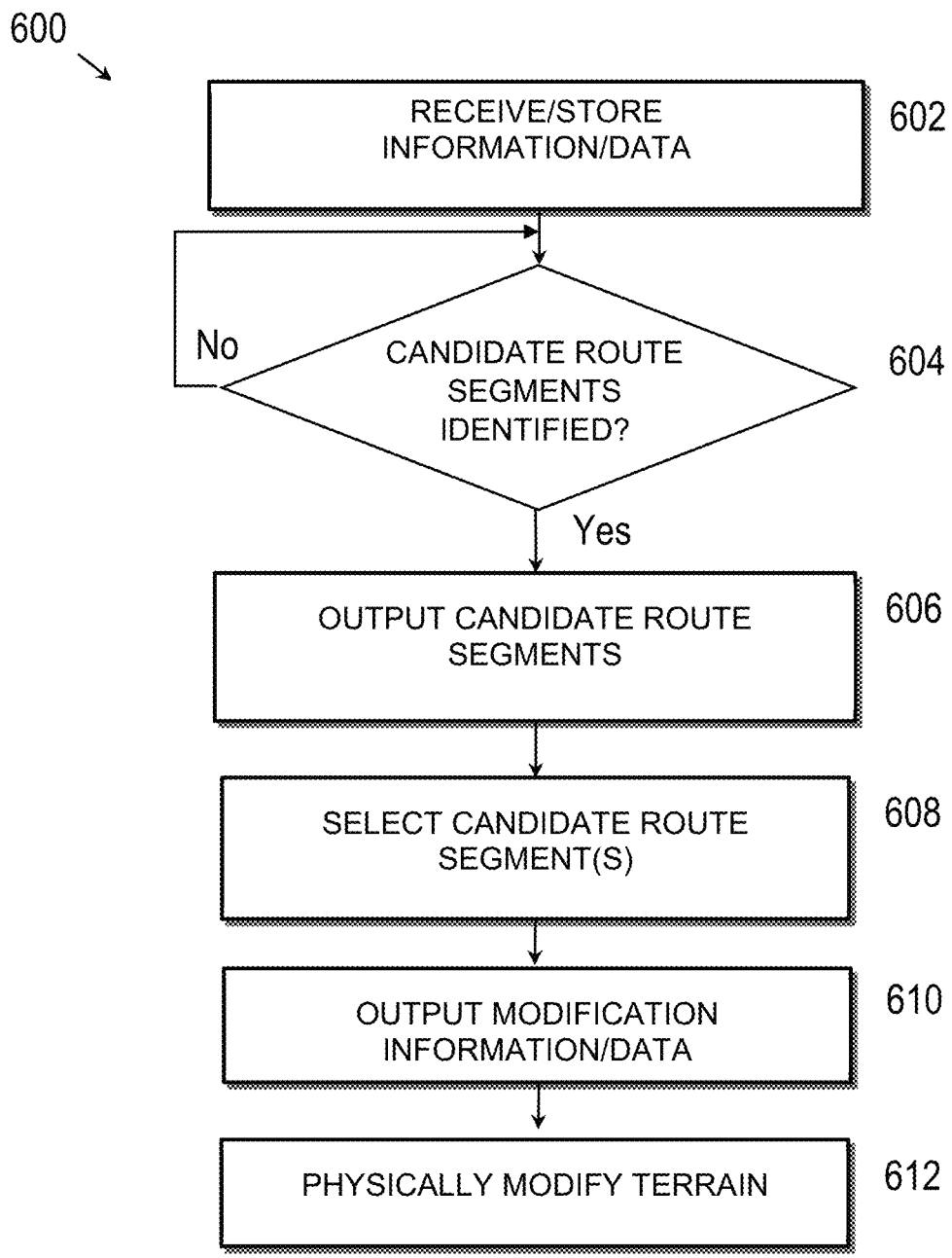
FIG. 6 is a flow chart of a method according to one or more embodiments of the disclosed subject matter.

FIG. 6 is a flow chart of a method 600 according to embodiments of the disclosed subject matter. Some or all of the method 600 can be performed via a non-transitory computer-readable storage medium (or media) having stored thereon instructions that, when executed by one or more processors, such as processor(s) 112, causes the one or more processors to perform some or all of the method 600. According to one or more embodiments, the method 600 may be referred to or characterized as a method for identifying physical modifications to make to the worksite 100 for battery optimization or enhancement of battery electric machines, such as machines 200, for future traversal of the worksite 100.

At 602, machine information 250 and/or machine operating data 240 can be received. As discussed above, such machine information 250 and such machine operating data 240 can include battery data or information, including battery usage data and/or battery health data. The machine information 250 can be received by the worksite facility 110 via the network 310, and the machine operating data 240 can be received from one or more of the machines 200 via the wireless network 320, for instance. The machine operating data 240 can be received continuously by the worksite facility 110 or at predetermined intervals from each of the machines 200, including, for instance, according to a batch of a set of the machines 200 (e.g., all of the machines 200). The machine operating data 240 (e.g., battery data) can pertain to previous traversals of one or more of the route segments 105 and/or to route segments having similar terrain characteristics. Optionally, such machine operating data 240 can be associated with specific machines or specific types of machines. The machine operating data 240 thus received may be stored in memory of a storage device, such as memory 114 of the worksite management facility 110, and can be accessed by the processor(s) 112. The stored machine operating data 240 can be considered or characterized as historical data. Thus, the stored battery data forming at least part of the stored machine operating data 240 may be considered or characterized as historical battery data. The machine information 250 may also be stored in the memory 114. The machine information 250 and the machine operating data 240 may be received (and stored) at different times.

Worksite information or data, such as the map 125 and current terrain data for the map 125, can also be received or accessed at 602. The worksite information can be received (and stored) at a time different from the receipt (and storage) of the machine information 250 and/or the machine operating data 240. The current terrain data can be retrieved from the map 125 of the worksite 100. As noted above, the current terrain data can be associated with respective one or more route segments 105. The current terrain data may be stored in the memory 114 of the worksite management facility 110 and can be accessed by the processor(s) 112.

At 604 the method 600 can determine or identify whether one or more candidate route segments 106, from among the route segments 105, exist for which to modify the current terrain in order to improve battery performance (e.g., battery usage and/or battery health) of one or more of the machines 200 for future traversal of the one or more route segments 105. That is, operation 604 can involve determining which route segments 105, if any, if physically modified, would lead to improvement of battery performance of one or more machines 200 should the one or more machines 200 travel along the route segment(s) 105 in the future. This can involve determining the way or ways in which the terrain of the candidate route segment 106 can be modified to achieve the improvement(s) in battery performance as well as the specific battery performance improvement information (including specific values). Such future traversal may be in comparison to future traversal without making the physical modifications to the terrain of the route segment 105. The processing for operation 604 can be performed by the processor(s) 112 of the worksite management facility 110, for instance. Operation 604 may be performed in response to a request, for instance, from the operator at the worksite management facility 110. According to one or more embodiments, operation 604 may be the start of the method 600.

The specific way or manner in which the route segment 105 can be modified to achieve the battery performance improvement can include or pertain to, relative to the current terrain, length, grade (e.g., % and/or incline, flat, decline), surface (e.g., rolling resistance, composition, hardness or softness, wet or dry), geometry/shape (e.g., curved, straight, width, etc.), etc. In this regard, specific values can be identified. For instance, the determination may identify, as one way improve battery performance, that a decrease in the incline of the route segment 105 of 2% can lead to battery performance improvement. Optionally, multiple specific ways of physical modification can be determined per candidate route segment 106. Of course, such specific values can be estimates, at least as they pertain to the corresponding amount of battery improvement.

The specific battery performance improvement (e.g., enhancement or optimization) can include or pertain to, relative to the current terrain, battery improvement in terms of amount of energy saved for the route segment 105, amount of energy added (e.g., due to regenerative braking), difference in amount of energy used for the route segment 105, cost savings, difference in machine down time (e.g., time due to charging amount and/or speed, battery replacement), preventing battery charge from decreasing below a predetermined charge threshold, for instance, upon completion of the route segment 105, etc. Indeed, as noted above, battery performance can be in terms of battery usage and/or battery health for one machine 200 or multiple machines 200. In this regard, specific values can be identified.

For instance, the determination may identify that one physical modification to the candidate route segment 106 can result in an energy savings of 10% for one machine 200, or multiple machines 200 collectively or cumulatively, that traverse(s) the route segment 105 under the physical modification compared to the same machine(s) 200 traversing the route segment 105 under the current terrain of the route segment 105. Of course, such specific values can be estimates. Relating the specific battery performance improvement to the physical modification, as but one example, the determination may in a sense determine that if the grade of a particular segment 105 or segments 105 is changed by a certain amount or to a certain grade (e.g., 5% to 2%), this change would decrease battery usage over the segment(s) 105 by 20% compared to the current terrain.

If one or more candidate route segments 106 are determined to exist at 604, the method 600, at 606, can output the candidate route segment(s) 106, for instance, on the display 116. Such outputting can involve listing the candidate route segments 106 on the display 116 and/or indicating the candidate route segments 106 on the map 125 shown on the display 116.

As noted above, the candidate route segments 106 may be displayed in a list on the display 116. Modification information, that is, information regarding how the candidate route segment 106 is to be physically modified and/or information specifying the battery performance enhancement or improvement (e.g., including a specific value) associated with the physical modification, can be displayed in association with the candidate route segment 106. Such modification information is shown generally in FIG. 3 as "mod info."

Additionally or alternatively, the candidate route segments 106 can be displayed on the map 125 on the display 116, such as shown in FIG. 4. According to one or more embodiments, the candidate route segments 106 for consideration to improve battery performance (e.g., battery usage and/or battery health) of one or more of the machines 200 for future traversal of the corresponding one or more route segments 105 may be identified directly, for instance, overlaid, on the map 125. Additionally or alternatively, call-outs, such as shown in FIG. 4, can identify the candidate route segments 106. Modification information, that is, information regarding how the candidate route segment 106 is to be physically modified and/or information specifying the battery performance enhancement or improvement (e.g., including a specific value) associated with the physical modification, can be displayed in association with the candidate route segment 106.

At 608 the method 600 can include selecting one or more of the candidate route segments 106, for instance, as shown within or in association with the graphical user interface 117 on the display 116. Optionally, operation 608 can involve selection of multiple candidate route segments 106 for different route segments 105 at the same time. In the case of multiple candidate route segments 106 for the same route segment 105, such as mod info. #1 and mod info. #2 for route segment #1 in FIG. 3, only one of the candidate route segments 106 may be selected or multiple candidate route segments 106 (e.g., all) may be selected, for instance, for comparison by the operator using the graphical user interface 117.

Selection of the candidate route segment(s) 106 can cause modification information to be output, for instance, displayed (if not already displayed) on the display 116, at operation 610 of method 600. According to one or more embodiments, this can involve hovering a pointer over the candidate route segment 106 or contacting the candidate route segment 106 for a predetermined amount of time, for instance, to generate a caption or the like with the modification information.

Once the operator, for instance, at the worksite management facility 110, has selected one or more candidate route segments 106 to physically modify (which can include in what way to modify the one or more route segments 105) to enhance battery performance (e.g., battery usage and/or battery life) of subsequent traversal of the corresponding one or more route segments 105, method 600 can, at 612, physically modify the terrain of the selected candidate route segment(s) 106, or at least perform operations to initiate, instruct, and/or control such physical modifications. For instance, the worksite management facility 110 can output a command or instruction to one or more machines 420, such as shown in FIG. 5, to make the physical modification(s) to the one or more route segments 105.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Further, as used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/ software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present. This definition of "circuitry" can apply to all uses of this term in this application, including in any claims. As a further example, as used in this application, the term "circuitry" can also cover an implementation of merely a processor (or multiple processors) or portion of a processor and its (or their) accompanying software and/or firmware.

Use of the terms "data," "content," "information" and similar terms may be used interchangeably, according to some example embodiments of the present disclosure, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Aspects of the present disclosure have been described above with reference to flowchart illustrations and/or block diagrams of methods, apparatus (systems) and computer program products according to embodiments of the present disclosure. In this regard, the flowchart and block diagrams in the Figures illustrate the architecture, functionality, and operation of possible implementations of systems, methods and computer program products according to various embodiments of the present disclosure. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, A, B, C, and C; etc.

Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A system for identifying modifications to terrain characteristics of a worksite to improve battery performance of electric machines traversing the worksite, the worksite being segmented according to a plurality of predetermined route segments, the system comprising:

non-transitory computer-readable memory having stored therein terrain data for each of the plurality of predetermined route segments and simulated battery usage data and simulated battery health data associated with each the of the plurality of predetermined route segments for related machines and/or routes or portions thereof with related terrain characteristics to identify the modifications to terrain characteristics of the worksite to improve the battery performance of the electric machines; and processing circuitry operatively coupled the non-transitory computer-readable memory to access the terrain data and the simulated battery usage data and the simulated battery health data, the processing circuitry being configured to:

access the terrain data and the simulated battery usage data and the simulated battery health data from the non-transitory computer-readable memory, identify one or more candidate predetermined route segments for which to modify a current terrain to improve battery usage and/or battery health for one or more of the electric machines for future traversal of said one or more candidate predetermined route segments, determine specific modification information to modify the current terrain of the selected at least one of the one or more candidate predetermined route segments in order to improve battery usage and/or battery health based on a comparison of the simulated battery usage data and the simulated battery health data against at least said one or more candidate predetermined route segments, and control display of, on a graphical user interface (GUI) and in response to user selection of at least one of the one or more candidate predetermined route segments:

the specific modification information to modify the current terrain of the selected at least one of the one or more candidate predetermined route segments in order to improve battery usage and/or battery health, and estimated battery usage improvement information and/or estimated battery health improvement information associated with the specific modification information for modifying for the current terrain of the selected at least one of the one or more candidate predetermined route segments, wherein the identified one or more candidate predetermined route segments for which to modify the current terrain to improve battery usage and/or battery health are displayed on an electronic map of the worksite, and wherein the identified one or more candidate predetermined route segments for which to modify the current terrain to improve battery usage and/or battery health are displayed so as to show prioritization in terms of greatest to least improvement of battery usage and/or battery health.

2. The system according to claim 1, wherein the processing circuitry is configured to determine that the current terrain of one or more of the candidate predetermined route segments should be physically modified to improve the battery usage and/or the battery health based on machine operating data from at least one of the electric machines, and wherein the machine operating data includes battery usage data and/or battery health data associated with the at least one electric machine traversing the one or more candidate predetermined route segments.

3. The system according to claim 1, further comprising a network, wherein the processing circuitry is operatively coupled to the network, wherein the processing circuitry is configured to output, via the network, one or more instructions to modify the current terrain of the selected at least one of the one or more candidate predetermined route segments according to the specific modification information to improve battery usage and/or battery health.

4. The system according to claim 1, wherein possible modifications to the terrain include changing a slope or grade and/or changing a road surface characteristic.

5. The system according to claim 1, wherein improvement of battery usage includes, for each of the one or more candidate predetermined route segments, lessening an amount of energy used by a battery for each of the one or more candidate predetermined route segments, and/or wherein improvement of battery health includes, for each of the one or more candidate predetermined route segments, limiting degradation of one or more battery performance-related characteristics.

6. The system according to claim 1, wherein the specific modification information to modify the current terrain of the selected at least one of the one or more candidate predetermined route segments includes multiple modification candidates for modifying the current terrain differently for each said selected candidate predetermined route segment, and wherein the estimated battery usage improvement information and/or the estimated battery health improvement information are displayed for each of the multiple modification candidates.

7. The system according to claim 1, wherein the processing circuitry is configured to:

store received battery usage data and/or battery health data in the non-transitory computer-readable storage memory as the simulated battery usage data and/or the simulated battery health data, respectively.

8. The system according to claim 1, wherein the identified one or more candidate predetermined route segments for which to modify the current terrain to improve battery usage and/or battery health are displayed so as to show the prioritization in terms of balance between greatest to least improvement of battery usage and/or battery health and expenditure to make the specific modifications.

9. A method for identifying modifications to potentially be made to a worksite for battery optimization of an electric machine when traversing the worksite, the worksite being segmented according to a plurality of predetermined route segments, the method comprising:

identifying, using one or more processors, candidate predetermined route segments from among the plurality of predetermined route segments for which to modify a current terrain to improve battery usage and/or battery health for the electric machine upon future traversal of said candidate predetermined route segments compared to future traversal of said candidate predetermined route segments each having the current terrain without modification according to any of the candidate predetermined route segments, said identifying candidate predetermined route segments being based on terrain data and battery usage data and/or battery health data for the candidate predetermined route segments as well as battery usage data and/or battery health data for one or more related machines and/or one or more routes or portion thereof with related terrain characteristics to identify the modifications potentially to be made to the worksite;

outputting on or over an electronically generated map of the worksite, using a display, each of the identified candidate predetermined route segments for which to modify the current terrain to improve battery usage and/or battery health for the electric machine upon future traversal of said candidate predetermined route segments; and outputting, using the display, in response to operator selection of at least one of the candidate predetermined route segments:

specific modification information to modify the current terrain of the selected at least one candidate predetermined route segments to improve battery usage and/or battery health for the electric machine, and estimated battery usage improvement information and/or estimated battery health improvement information associated with the specific modification information for the current terrain of the selected candidate predetermined route segments, wherein said outputting on the display each of the identified candidate predetermined route segments for which to modify the current terrain to improve battery usage and/or battery health for the electric machine upon future traversal of said candidate predetermined route segments is such that the identified candidate predetermined route segments are displayed according to prioritization in terms of greatest to least amount of improvement of the battery usage and/or the battery health.

10. The method according to claim 9, further comprising outputting, using the one or more processors, one or more instructions to modify the current terrain of the selected at least one of the candidate predetermined route segments according to the specific modification information to improve battery usage and/or battery health for the electric machine upon future traversal of said candidate predetermined route segments.

11. The method according to claim 9, further comprising:
receiving battery usage data and/or battery health data, via a wireless network, from the electric machine, for previous traversals of the plurality of predetermined route segments of the worksite; and
storing the received battery usage data and/or battery health data in a storage, which is accessible by the one or more processors, as the battery usage data and/or battery health data, respectively.

12. The method according to claim 9, wherein the specific modification information to modify the current terrain of the selected at least one of the candidate predetermined route segments to improve battery usage and/or battery health for the electric machine involves adjustment of a regenerative braking operation for the electric machine along the selected candidate predetermined route segments.

13. The method according to claim 9, further comprising displaying, on a graphical user interface (GUI) displayed on the display, on or over the map of the worksite, the identified candidate predetermined route segments for which to modify the current terrain to improve battery usage and/or battery health for the electric machine upon future traversal of said candidate predetermined route segments.

14. The method according to claim 9, wherein the battery usage data is simulated battery usage data and/or the battery health data is simulated battery health data.

15. A non-transitory computer-readable storage medium having stored thereon instructions that, when executed by one or more processors, causes the one or more processors to perform a method comprising:
determining, using terrain data and battery usage data and/or battery health data, as well as battery usage data and battery health data for one or more related machines and one or more routes or portion thereof with related terrain characteristics to identify one or more modifications to be made to one or more of candidate route segments of a worksite to modify to improve battery usage and/or battery health for a vehicle upon future traversal of the one or more candidate route segments by the vehicle;
determining specific modification information to modify the one or more candidate route segments in order to improve battery usage and/or battery health based on a comparison of the battery usage data and the battery health data against at least said one or more candidate route segments;
controlling output of each of the determined one or more of the candidate route segments for which to modify for output relative to a map of the worksite displayed on a display;
controlling output of estimated battery usage improvement information and/or estimated battery health improvement information for at least one user-selected candidate route segment from among the determined one or more of the candidate route segments for output relative to the map of the worksite displayed on the display; and
outputting, via a network, signaling that includes instructions to modify the at least one selected candidate route segment to improve the battery usage and/or the battery health according to the estimated battery usage improvement information and/or estimated battery health improvement information and the specific modification information,
wherein said outputting signaling is to one or more vehicles to perform the modification to the selected at least one of the candidate route segment to improve the battery usage and/or the battery health.

16. The non-transitory computer-readable storage medium according to claim 15, wherein said controlling output of each of the determined one or more candidate route segments for which to modify is such that the determined one or more candidate route segments are displayed according to prioritization in terms of greatest to least amount of improvement of the battery usage and/or the battery health.

17. The non-transitory computer-readable storage medium according to claim 15, further comprising receiving the terrain data and the battery usage data and/or the battery health data for a plurality of candidate route segments of the worksite, including the one or more of the candidate route segments.

18. The non-transitory computer-readable storage medium according to claim 15, further comprising displaying, relative to the map of the worksite and on a graphical user interface (GUI), the determined one or more of the candidate route segments for which to modify to improve the battery usage and/or the battery health.

* * * * *